United States Patent
So et al.

(10) Patent No.: US 7,386,646 B2
(45) Date of Patent: Jun. 10, 2008

(54) SYSTEM AND METHOD FOR INTERRUPT DISTRIBUTION IN A MULTITHREAD PROCESSOR

(75) Inventors: Kimming So, Palo Alto, CA (US); Baobinh N. Truong, San Jose, CA (US); Jason Leonard, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 149 days.

(21) Appl. No.: 11/213,009

(22) Filed: Aug. 25, 2005

(65) Prior Publication Data

US 2007/0067533 A1    Mar. 22, 2007

(51) Int. Cl.
*G06F 13/24* (2006.01)
(52) U.S. Cl. ........................ 710/260; 710/267
(58) Field of Classification Search ........ 710/260–269, 710/48–51
See application file for complete search history.

(56) References Cited

U.S. PATENT DOCUMENTS

| | | | |
|---|---|---|---|
| 5,987,538 A * | 11/1999 | Tavallaei et al. | 710/48 |
| 6,275,749 B1 * | 8/2001 | Saville et al. | 700/292 |
| 6,370,606 B1 * | 4/2002 | Bonola | 710/260 |
| 6,701,429 B1 * | 3/2004 | Gustafsson et al. | 713/1 |
| 6,779,065 B2 * | 8/2004 | Murty et al. | 710/260 |
| 6,813,665 B2 * | 11/2004 | Rankin et al. | 710/260 |
| 6,952,749 B2 * | 10/2005 | Kim | 710/260 |
| 2003/0200250 A1 * | 10/2003 | Kiick | 709/102 |
| 2005/0060460 A1 * | 3/2005 | Karamatas et al. | 710/260 |

* cited by examiner

*Primary Examiner*—Raymond N Phan
(74) *Attorney, Agent, or Firm*—McAndrews, Held & Malloy, Ltd.

(57) ABSTRACT

A system and method for interrupt distribution in a multithread processor are disclosed. A connection between an interrupt and a set of thread processors can be programmed. When the interrupt is executed, the set of thread processors are affected. While executing the thread processor tasks, the connection may be reprogrammed to interrupt another set of thread processors.

18 Claims, 3 Drawing Sheets

SYSTEM AND METHOD FOR INTERRUPT DISTRIBUTION IN A MULTITHREAD PROCESSOR

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Concurrent Multithread (CMT) Processors contain multiple hardware thread units, each multithread processor can execute a program simultaneously. Interrupt control of a CMT processor may be required for many applications, e.g. digital signal processing (DSP). DSP applications can have program modules that operate at different levels of priority. An operation system may be required to preempt one program module in order to execute another program module of higher priority.

Limitations and disadvantages of conventional and traditional approaches will become apparent to one of skill in the art, through comparison of such systems with some aspects of the present invention as set forth in the present application with reference to the drawings.

BRIEF SUMMARY OF THE INVENTION

Aspects of the present invention may be found in a multithread processor, multiprocessor systems, or multi-core systems. The present invention discloses systems and methods for interrupt distribution. A connection between an interrupt and a set of processors can be programmed. When the interrupt is executed, the set of processors are affected. While executing the processor tasks, the connection may be reprogrammed to interrupt another set of processors.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate to interrupt distribution and more specifically, to interrupt distribution in a concurrent multithread processor. Although the following description may refer to a particular number of interrupts and thread processors (TPs), other configurations for interrupt distribution can be designed that have a differing number of interrupts and/or thread processors without departing from the spirit and scope of the present invention. The number of interrupts may be different than the number of thread processors.

Figure 1:
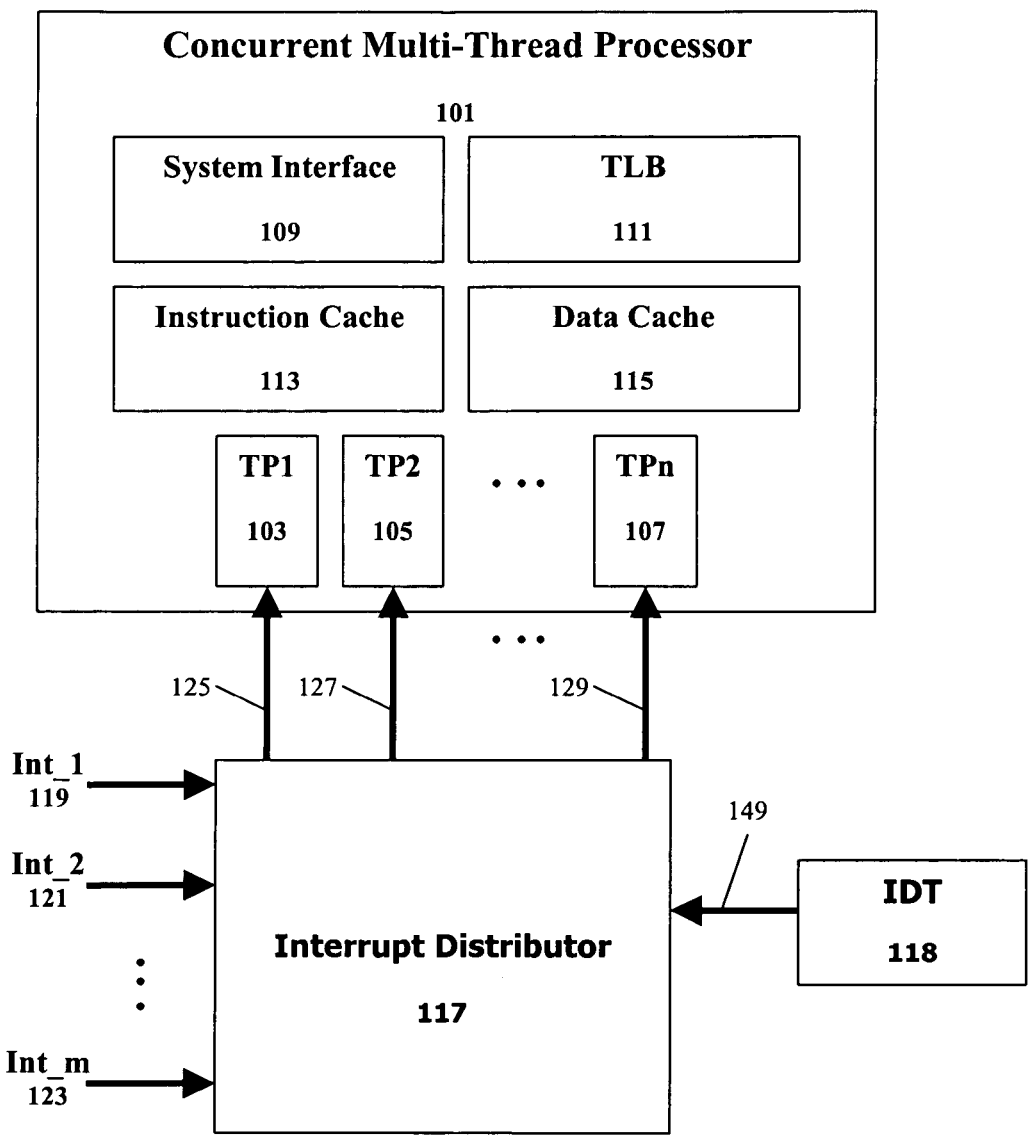
FIG. 1 is an illustration of an exemplary system with interrupt distribution in accordance with the present invention.

FIG. 1 is an illustration of an exemplary architecture 100 in which a representative embodiment of the present invention may be practiced. The architecture 100 may comprise a concurrent multithread (CMT) processor 101, an interrupt distributor 117, and an Interrupt Distribution Table (IDT) 118.

The CMT processor 101 contains a set of execution elements, called the thread processors (TPs) 103, 105, and 107. Each TP 103, 105, and 107 can execute a program independently and receive external interrupts. TPs 103, 105, and 107 can share system resources such as a system interface 109, a translation look-aside buffer (TLB) 111, an instruction cache 113, and a data cache 115.

Interrupts 119, 121, and 123 can be connected in various combinations at 125, 127, and 129 to TPs 103, 105, and 107. Each interrupt 119, 121, and 123 may also comprise more than one interrupt command. The combinations of connections can be controlled dynamically by a programmable input 149.

The programmable input 149 can come from the IDT 118. The IDT 118 can be kept in the CPU control registers or shared memory locations that are accessible when the CPU or the accessing TP is in kernel mode. The values in the IDT 118 can be reprogrammed so that the interrupts 119, 121, and 123 can be re-assigned or re-distributed to TPs 103, 105, and 107 at runtime.

Figure 2:
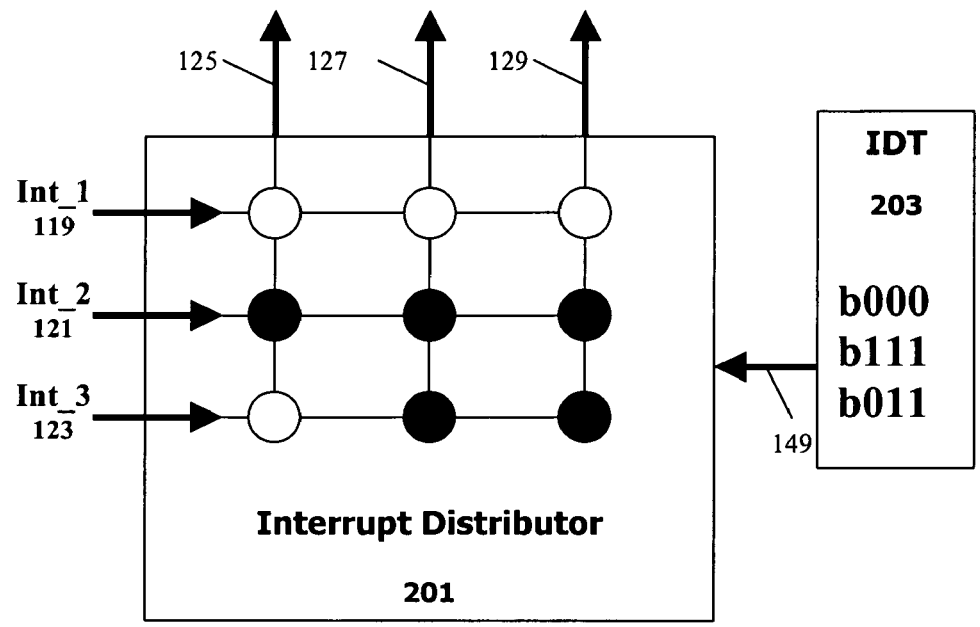
FIG. 2 is an illustration of an exemplary interrupt distributor and interrupt distribution table in accordance with the present invention

FIG. 2 is an exemplary embodiment of an interrupt distributor 201 and an IDT 203 in accordance with the present invention. The interrupt distributor 201 may connect any interrupt 119, 121, or 123 with any combination of TP inputs 125, 127, or 129 or with no TP input. The IDT 203 can contain a bit for every unique pair of interrupt and TP. The bit values 'zero' and 'one' can correspond to the unconnected state and connected state of each interrupt/TP pair.

In the example of FIG. 2, each 3-bit word in the IDT 118 corresponds to an interrupt. The most significant bit of a word corresponds to TP1, and the least significant bit of a word corresponds to TP3. In this example, the first value, b000, in the IDT 203 connects Int_1 to none of the TP inputs; the second value, bill, in the IDT 203 connects Int_2 to all of the TP inputs 125, 127, and 129; and the third value, boll, in the IDT 203 connects Int_3 to two of the TP inputs 127 and 129.

Figure 3:
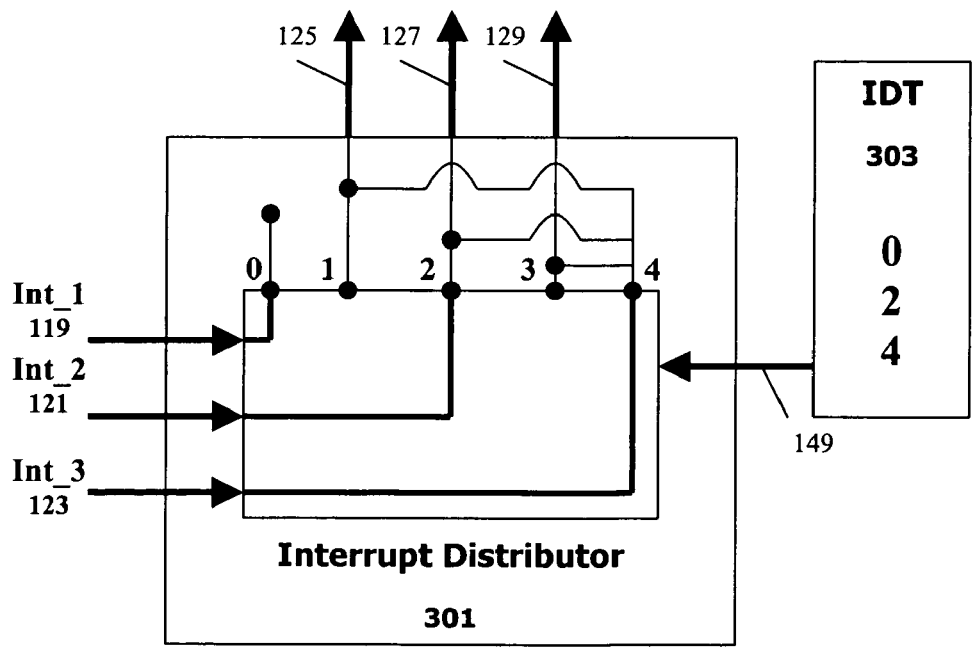
FIG. 3 is an illustration of another exemplary interrupt distributor and interrupt distribution table in accordance with the present invention

FIG. 3 is another embodiment of an interrupt distributor 301 and an IDT 303 in accordance with the present invention. The interrupt distributor 301 may connect any interrupt 119, 121, or 123 with no inputs; any single TP input 125, 127, or 129; or all TP inputs 125, 127, and 129. If there are n TPs, each interrupt can have an associated IDT 303 value from 0 to n+1. If an IDT 303 value is 0, the interrupt may not be used. If an IDT 303 value is n+1, the interrupt may be used for all inputs 125, 127, and 129. If an IDT 303 value is from 1 to n, the interrupt may be used for a corresponding input 125, 127, or 129.

In the example of FIG. 3, the first value, 0, in the IDT 303 connects Int_1 to none of the TP inputs; the second value, 2, in the IDT 303 connects Int_2 to the second TP input 127;

and the third value, 4, in the IDT 303 connects Int_3 to all of the TP inputs 125, 127 and 129.

Figure 4:
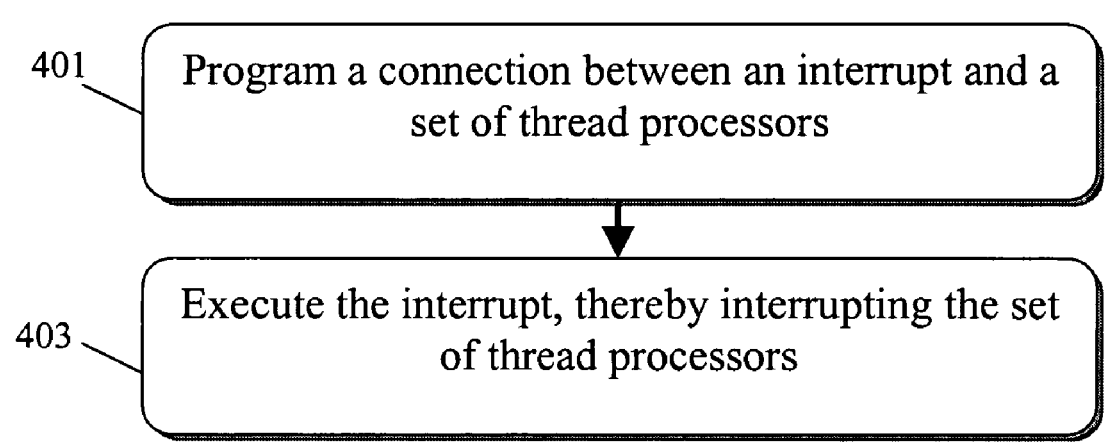
FIG. 4 is a flowchart illustrating an exemplary method for interrupt distribution in accordance with a representative embodiment of the present invention.

FIG. 4 shows a flowchart illustrating an exemplary method performing interrupt distribution in accordance with a representative embodiment of the present invention.

A connection is programmed between an interrupt and a set of thread processors at 401. The IDT 203 in FIG. 2 and the IDT 303 in FIG. 3 are examples of the connection indicators that can be used to program (and reprogram whenever necessary) an interrupt distributor.

At 403, the interrupt is executed, thereby interrupting the set of thread processors. The interrupt may be generated by a real time operating system that prioritizes tasks handled by thread processors. Depending on the priority of the interrupt, only a subset of thread processors may require the communication of an interrupt.

The present invention is not limited to the particular aspects described. Variations of the examples provided above may be applied to a variety of multithread processors without departing from the spirit and scope of the present invention.

Accordingly, the present invention may be realized in hardware, software, or a combination of hardware and software. The present invention may be realized in a centralized fashion in an integrated circuit or in a distributed fashion where different elements are spread across several circuits. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for interrupt distribution in a multithread processor, wherein the system comprises:
   a set of thread processors;
   a reprogrammable interrupt distribution table for storing a connection indicator, wherein the connection indicator is an integer value that corresponds to a numbered thread processor in the set of thread processors; and
   an interrupt distributor for connecting an interrupt to the set of thread processors based on the connection indicator.

2. The system of claim 1, wherein the set of thread processors comprises one or more thread processors.

3. The system of claim 1, wherein if the connection indicator is zero, the interrupt is connected to zero thread processors.

4. The system of claim 1, wherein the interrupt distribution table is reprogrammable at runtime.

5. The system of claim 1, wherein if the connection indicator is greater than the number of thread processors in the set of thread processors, the interrupt is connected to all thread processors in the set of thread processors.

6. A system for interrupt distribution in a multithread processor, wherein the system comprises:
   a memory for storing an integer value indicative of a connection between an interrupt and a set of thread processors, wherein the integer value is reprogrammable and corresponds to a numbered thread processor in the set of thread processors; and
   a circuit for connecting the interrupt and the set of thread processors based on the integer value.

7. The system of claim 6, wherein the set of thread processors comprises one or more thread processors.

8. The system of claim 6, wherein if the connection indicator is zero, the interrupt is connected to zero thread processors.

9. The system of claim 6, wherein the memory is reprogrammable at runtime.

10. The system of claim 6, wherein if the connection indicator is greater than the number of thread processors in the set of thread processors, the interrupt is connected to all thread processors in the set of thread processors.

11. A method for interrupt distribution in a multithread processor, wherein the method comprises:
    connecting an interrupt to a set of thread processors, wherein the connection is specified in a reprogrammable interrupt distribution table by an integer value that corresponds to a numbered thread processor in the set of thread processors; and
    interrupting the set of thread processors.

12. The method of claim 11, wherein the set of thread processors comprises one or more thread processors.

13. The method of claim 11, wherein if the connection indicator is zero, the interrupt is connected to zero thread processors.

14. The method of claim 11, wherein the connection is reprogrammable at runtime.

15. A machine-readable storage, having stored thereon a computer program having a plurality of code sections for implementing a method for interrupt distribution in a multithread processor, the code sections executable by a machine for causing the machine to:
    program a connection between an interrupt and a set of thread processors, wherein the connection is specified in a reprogrammable interrupt distribution table by an integer value that corresponds to a numbered thread processor in the set of thread processors; and
    execute the interrupt, thereby interrupting the set of thread processors.

16. The machine-readable storage of claim 15, wherein the set of thread processors comprises one or more thread processors.

17. The machine-readable storage of claim 15, wherein if the connection indicator is zero, the interrupt is connected to zero thread processors.

18. The machine-readable storage of claim 15, wherein the connection is reprogrammable at runtime.

* * * * *